United States Patent
Sakamoto et al.

(10) Patent No.: US 6,510,112 B1
(45) Date of Patent: Jan. 21, 2003

(54) DRIVE APPARATUS FOR OPTICAL RECORDING MEDIUM

(75) Inventors: Masato Sakamoto, Kawagoe (JP); Katsunori Tamamura, Kawagoe (JP); Kazuhiko Oogami, Kawagoe (JP); Norikazu Tada, Tendo (JP); Atsushi Kusaka, Tendo (JP); Akihito Fujiwara, Tendo (JP); Mayumi Takahashi, Kawagoe (JP)

(73) Assignees: Pioneer Corporation, Tokyo-to (JP); Tohoku Pioneer Corporation, Yamagata-ken (JP)

( * ) Notice: Subject to any disclaimer, the term of this patent is extended or adjusted under 35 U.S.C. 154(b) by 0 days.

(21) Appl. No.: 09/443,438

(22) Filed: Nov. 19, 1999

(30) Foreign Application Priority Data

Nov. 20, 1998 (JP) ............................. 10-331444

(51) Int. Cl.$^7$ ................................................ G11B 7/00
(52) U.S. Cl. ................................ 369/44.35; 369/44.33; 369/44.32; 369/44.28
(58) Field of Search ........................... 369/44.27, 44.28, 369/44.29, 44.35, 44.34, 44.33, 44.32

(56) References Cited

U.S. PATENT DOCUMENTS

| | | | |
|---|---|---|---|
| 5,909,414 A | * 6/1999 | Ohta | 369/44.33 |
| 5,995,463 A | * 11/1999 | Sakashita | 369/58 |
| 6,028,826 A | * 2/2000 | Yamamoto et al. | 369/44.35 |
| 6,084,836 A | * 7/2000 | Kamiyama | 369/44.41 |
| 6,172,953 B1 | * 1/2001 | Kamiyama | 369/54 |

FOREIGN PATENT DOCUMENTS

| | | |
|---|---|---|
| EP | 0 102 607 | 3/1984 |
| EP | 0 160 095 | 11/1985 |
| JP | 4-30339 | 2/1992 |
| JP | 6-176390 | 6/1994 |

* cited by examiner

*Primary Examiner*—Nabil Hindi
(74) *Attorney, Agent, or Firm*—Finnegan, Henderson, Farabow, Garrett and Dunner, L.L.P.

(57) ABSTRACT

An apparatus for driving an optical pickup for a tracking servo control. The apparatus includes an emitting device disposed in the optical pickup for emitting a main beam to a first position on an information track of a recording medium and emitting at least two subsidiary beams to a second position and a third position on the information track of the recording medium, respectively. The positions of the main beam and the subsidiary beams are determined appropriately for a three beam method. The apparatus further includes: a tracking error signal generating device for generating a tracking error signal using returned light beams of the subsidiary beams from the recording medium; a driving device for moving the first position of the main beam and the second position and the third position of the subsidiary beams with respect to the recording medium; a tracking control device for outputting a driving signal based on the tracking error signal to the driving device; and a detecting device for detecting a damaged part on the recording medium. The tracking control device generates a pulse signal having a polarity opposite to a disturbance part of the driving signal generated due to at least one of the subsidiary beams passing on the damaged part, and uses this pulse signal as a part of the driving signal.

8 Claims, 16 Drawing Sheets

CAUSED BY PASSING
ON BRACK DOT (A)　　　　　(B)　　　　　(C)

THRESHOLD VALUE

CAUSED BY PASSING
ON SCRATCH (A)　　　　　(B)　　　　　(C)

THRESHOLD VALUE

DRIVE APPARATUS FOR OPTICAL RECORDING MEDIUM

BACKGROUND OF THE INVENTION

1. Field of the Invention

The present invention relates to a drive apparatus for an optical recording medium such as an optical disk, more specifically relates to a drive apparatus for stabilizing tracking servo by applying a hold voltage to a driver of an optical pick-up upon detection of a defect.

2. Description of the Related Art

In a recording/reproducing apparatus for recording and reproducing information onto/from a disk such as CD (Compact disk) or LD (laser disk), information is accurately read from a recording track on the disk. In order to read the information accurately, a servo technique is used in the recording/reproducing apparatus. More concretely, a closed circuit loop for feedback is formed in the recording/reproducing apparatus, and a speed of a pick-up and disk, a position of a track and a focus of a lens are driven and controlled by the closed circuit loop.

In such a servo technique, an error signal is generated on the basis of a signal input from the pick-up. Further, error signal generating means for generating this error signal has a gain control function for controlling an input voltage so that its value becomes suitable. As this gain control function, an auto gain control circuit is frequently used.

Particularly, a technique for inputting a signal oscillated from a disturbance source as an input signal into a servo circuit and making the auto gain control using the signal is known. This technique is effective because the gain control value can be measured accurately in the servo circuit. When the auto gain control operation is performed before actual reproducing operation, the gain control in the servo circuit can be made accurately, and thus stable servo operation can be realized.

However, when a light beam passes on a black dot, a scratch or the like, a defect occurs in an output signal which is obtained from an optical pick-up by receiving a returned light, and thus a normal RF signal and tracking error signal cannot be obtained. As a result, there is a possibility that the servo occasionally disrupted.

In order to prevent this, a conventional recording/reproducing apparatus is provided with defect detecting means. When a defect is detected by the defect detecting means, a driving signal to be given to the driver of the optical pick-up is held with its level being fixed to DC level just before the detection of the defect. As a result, an influence of the defect can be eliminated, and thus the servo can be stabilized.

However, in the conventional recording/reproducing apparatus, in the case where a 3-beam type optical pick-up is used, the following problem arises. When a beam passes on a black dot or a scratch, a tracking error signal slightly changes into positive or negative signal certainly. Due to the change in the tracking error signal, a pulse-type driving signal is output to the driver of the optical pick-up. As a result, an objective lens of the optical pick-up greatly shifts to a predetermined direction before the holding effect is produced. As a result, the light beam is greatly displaced, and the reproducing performance is deteriorated.

SUMMARY OF THE INVENTION

It is an object of the present invention to provide a drive apparatus for an optical recording medium which is capable of stabilizing tracking servo upon detection of a defect even in the case where a three-beam type optical pick-up is used.

A drive apparatus in accordance with the present invention drives an optical pickup for a tracking servo control. The drive apparatus includes an emitting device disposed in the optical pickup for emitting a main beam to a first position on an information track of a recording medium and emitting at least two subsidiary beams to a second position and a third position on the information track of the recording medium, respectively. The second position is different from the first position at least in a tangential direction of the recording medium. The third position is different from the first position at least in a tangential direction of the recording medium. Also, the second position is different from the third position at least in a tangential direction of the recording medium. The drive apparatus further includes: a tracking error signal generating device for generating a tracking error signal using returned light beams of the subsidiary beams from the recording medium; a driving device for moving the first position of the main beam, the second position of one of the subsidiary beams and the third position of the other of the subsidiary beams with respect to the recording medium; a tracking control device for outputting a driving signal based on the tracking error signal to the driving device; and a detecting device for detecting a damaged part on the recording medium. The tracking control device has a pulse signal generating device for generating a pulse signal having a polarity opposite to a disturbance part of the driving signal generated due to at least one of the subsidiary beams passing on the damaged part. The tracking control device then uses the pulse signal as a part of the driving signal.

In the drive apparatus of the present invention, when one of the subsidiary beams passes on a damaged part such a black dot or scratch existing on the recording medium, a defect is formed in reading signals based on the returned light beams of the subsidiary beams from the recording medium. Since the positions of the subsidiary beams are different from each other in at least a tangential direction of the recording medium, the timing that one of the subsidiary beams passes on the black dot (or scratch) and the timing that the other passes on the black dot (or scratch) are different in time. Because the tracking error signal is generated by, for example, subtraction or addition of the two reading signals obtained from the returned light beams of the subsidiary beams, the difference between the timings that the subsidiary beams pass on the black dot (or scratch) generates noise parts in the tracking error signal, and the waveform of each noise part is in the shape of a projection or horn. This means that the noise part has high frequency components. If the frequency components in the noise part exceed a frequency band of the tracking servo, it is difficult to remove the noise part. If the noise part remains in the tracking servo signal, the driving signal is disturbed and a disturbance part is formed in the driving signal. As a result, the driving device moves the positions of the main beam and the subsidiary beams to incorrect positions, and the main beam is thus displaced from a target information track.

To reduce the influence of the disturbance part of the driving signal on the operation of the driving device, the tracking control device has the pulse signal generating device. The pulse signal generating device generates a pulse signal having polarity opposite to the disturbance part of the driving signal, when the damaged part on the recording medium is detected by the detecting device, and then, the tracking control device uses the pulse signal as a part of the driving signal. By supplying the pulse signal to the driving device as a part of the driving signal, the driving device moves the main beam in the direction opposite to the moving direction of the main beam when the disturbance occurs in the driving signal, and thus the main beam is returned to the target information track immediately. Thus, according to the present invention, even in the case where one or both of the subsidiary beams passes on the damaged part on the recording medium, the tracking servo is executed stably.

In the above-mentioned drive apparatus, a signal maintaining device may be added to the tracking control device. The signal maintaining device sets the level of the driving signal at a hold level after the tracking control device uses the pulse signal as a part of the drive signal, and maintains the hold level for a predetermined period of time. The hold level is equal to the level of the driving signal in the state before the detecting device detects the damaged part. Furthermore, the signal maintaining device may maintain the hold level until the detection of the damaged part with the detecting device ends.

While the damaged part is detected by the driving device, the normal tracking error signal cannot be obtained. The signal maintaining device therefore sets the level of the driving signal at the hold level, for example, until the detection of the damaged part ends, after the tracking control device uses the pulse signal as a part of the driving signal. Since the hold level is equal to the level of the driving signal in the state before the detection of the damaged part, the influence of the damaged part can be reduced, so that the stable tracking servo can be achieved.

In the above-mentioned drive apparatus, a pulse setting device for setting a level or a pulse width of the pulse signal may be added. In this case, the pulse setting device may determine the level or the pulse width of the pulse signal on the basis of an amount of a movement of the main beam due to the disturbance part of the driving signal.

When the pulse signal generating device generates the pulse signal, the pulse setting device determines the level or the pulse width of the pulse signal on the basis of the amount of the movement of the main beam due to the disturbance part of the driving signal. Therefore, a pulse signal suitable for reducing the influence of the disturbance part is generated.

In the above-mentioned drive apparatus, a gain detecting device for detecting a gain of the tracking control device and a pulse setting device for setting a level or a pulse width of the pulse signal on the basis of the gain of the tracking control device may be added.

The variation of the gain of the tracking control device causes the increase or decrease of the level of the disturbance of the driving signal, and thus an amount of the main beam movement due to the disturbance of the driving signal increases or decreases. Therefore, the influence of the disturbance of the driving signal can be reduced by determining the level or the pulse width of the pulse signal on the basis of the gain of the tracking control device.

In the above-mentioned drive apparatus, a level detecting device for detecting a level of the tracking error signal and a pulse setting device for setting a level or a pulse width of the pulse signal on the basis of the level of the tracking error signal may be added.

The increase or decrease of the level of the tracking error signal relates to the increase or decrease of the gain of the tracking servo loop, and thus causes the increase or decrease of the disturbance of the driving signal, and thus an amount of the main beam movement due to the disturbance of the driving signal increases or decreases. Therefore, the influence of the disturbance of the driving signal can be reduced by determining the level or the pulse width of the pulse signal on the basis of the level of the tracking error signal.

In the above-mentioned drive apparatus, an RF signal generating device, an RF signal level detecting device and a pulse setting device may be added. The RF signal generating device is a device for generating an RF signal on the basis of a returned light beam of the main beam from the recording medium. The RF signal level detecting device is a device for detecting a level of the RF signal. The pulse setting device is a device for setting a level or a pulse width of the pulse signal on the basis of the level of the RF signal.

The RF signal is generated from the returned light beam of the main beam. The increase or decrease of the level of the RF signal relates to the increase or decrease of the gain of the tracking servo loop, and thus causes increase or decrease of the disturbance of the driving signal, and thus an amount of the main beam movement due to the disturbance of the driving signal increase or decrease. Therefore, the influence of the disturbance of the driving signal can be reduced by determining the level or the pulse width of the pulse signal on the basis of the level of the RF signal.

Moreover, a gain detecting device for detecting a gain of the tracking control device, a level detecting device for detecting a level of the tracking error signal, an RF signal generating device for generating an RF signal on the basis of a returned light beam of the main beam from the recording medium, an RF signal level detecting device for detecting a level of the RF signal, and a pulse setting device for setting a level or a pulse width of the pulse signal on the basis of the gain of the tracking control device, the level of the tracking error signal and the level of the RF signal may be added to the above-mentioned drive apparatus. By determining the level or the pulse width of the pulse signal on the basis of the gain of the tracking control device, the level of the tracking error signal and the level of the RF signal, the pulse signal appropriate for reducing the influence of the disturbance of the driving signal can be generated.

Moreover, in the above-mentioned drive apparatus, the pulse setting device (14) may incudes calculation device for generating a calculation value using a first value representing the gain of the tracking control device, a second value representing the level of the tracking error signal, a third value representing the level of the RF signal, a first coefficient for weighting the gain of the tracking control device, a second coefficient for weighting the level of the tracking error signal, and a third coefficient for weighting the level of the RF signal, and the pulse setting device may set the level or pulse width of the pulse signal on the basis of the calculation value.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

There will be described below preferred embodiments of the present invention with reference to the diagrams.

(i) First Embodiment

The present embodiment is a CD drive apparatus for a car, and this drive apparatus has a function for giving a reduced speed pulse to a driver of an optical pick-up upon detection of a defect so as to stabilize tracking servo.

Figure 1:
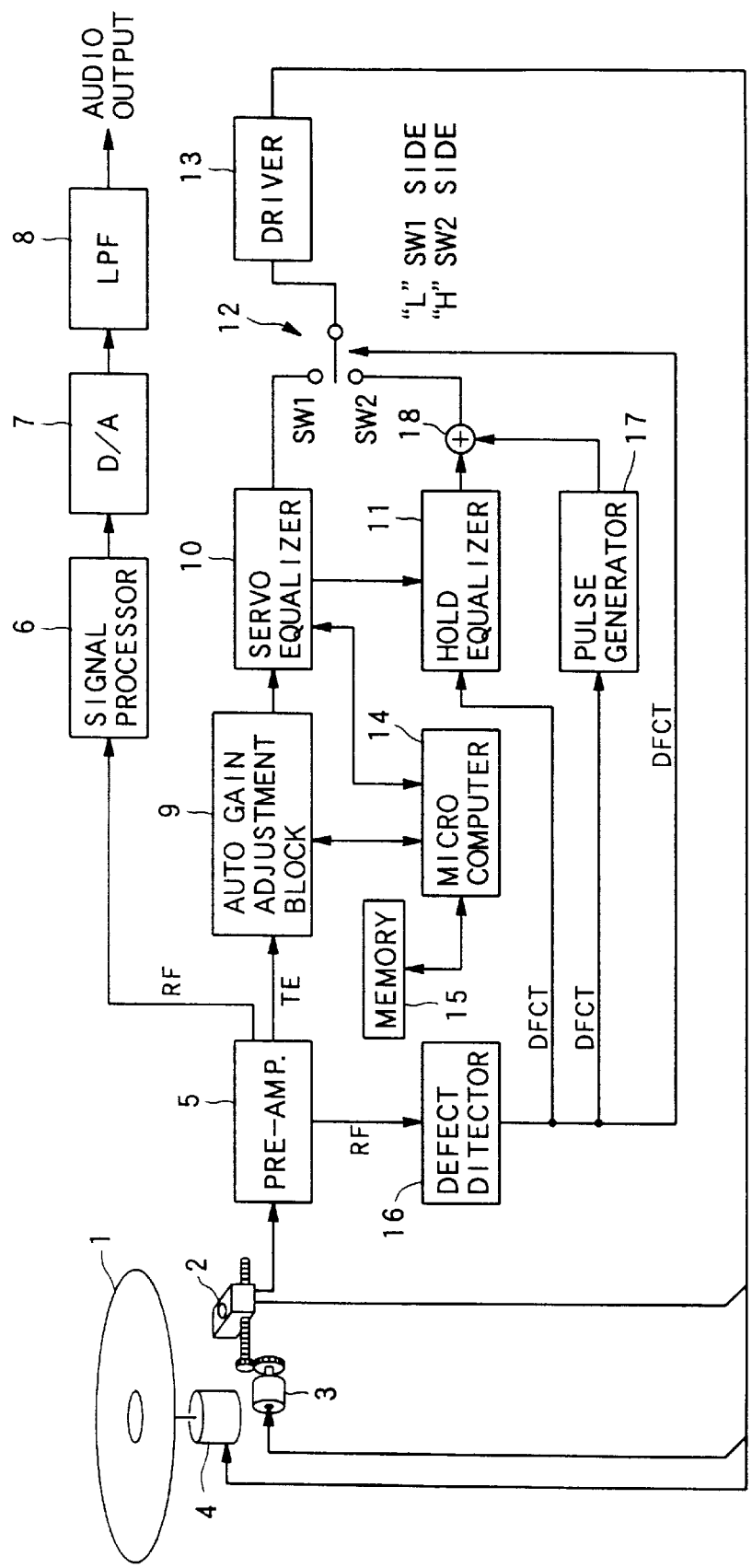
FIG. 1 is a block diagram showing a structure of a CD drive apparatus according to a first embodiment of the present invention.

FIG. 1 shows a structure of the CD drive apparatus according to the present embodiment. In FIG. 1, the CD drive apparatus according to the present embodiment includes: a disk 1 as an optical recording medium onto which a signal was recorded; a pick-up 2 for reading the recorded signal from an information track of the disk 1 through a lens (not shown); a carriage motor 3 for driving the pick-up 2 in a radial direction of the disk 1; a spindle motor 4 for rotating the disk 1; a pre-amplifier 5 for amplifying the signal read by the pick-up 2 so as to output a binarized RF signal as well as a focus error signal, a tracking error signal and the like; a signal processor 6 for generating a signal (CLV) for controlling a speed of the spindle motor 4 from the binarized RF signal, and executing EFM decoding from the RF signal, correction decoding by means of CIRC and the like so as to convert the signal into a digital signal of 16 bits and to transmit the digital signal to a D/A converter 11; a D/A converter 7 for converting the 16-bit digital signal into an analog signal; and a low-pass filter (LPF) 8 for letting the analog signal pass an audio frequency band and eliminating a noise portion therefrom so as to output the audio signal.

Figure 2:
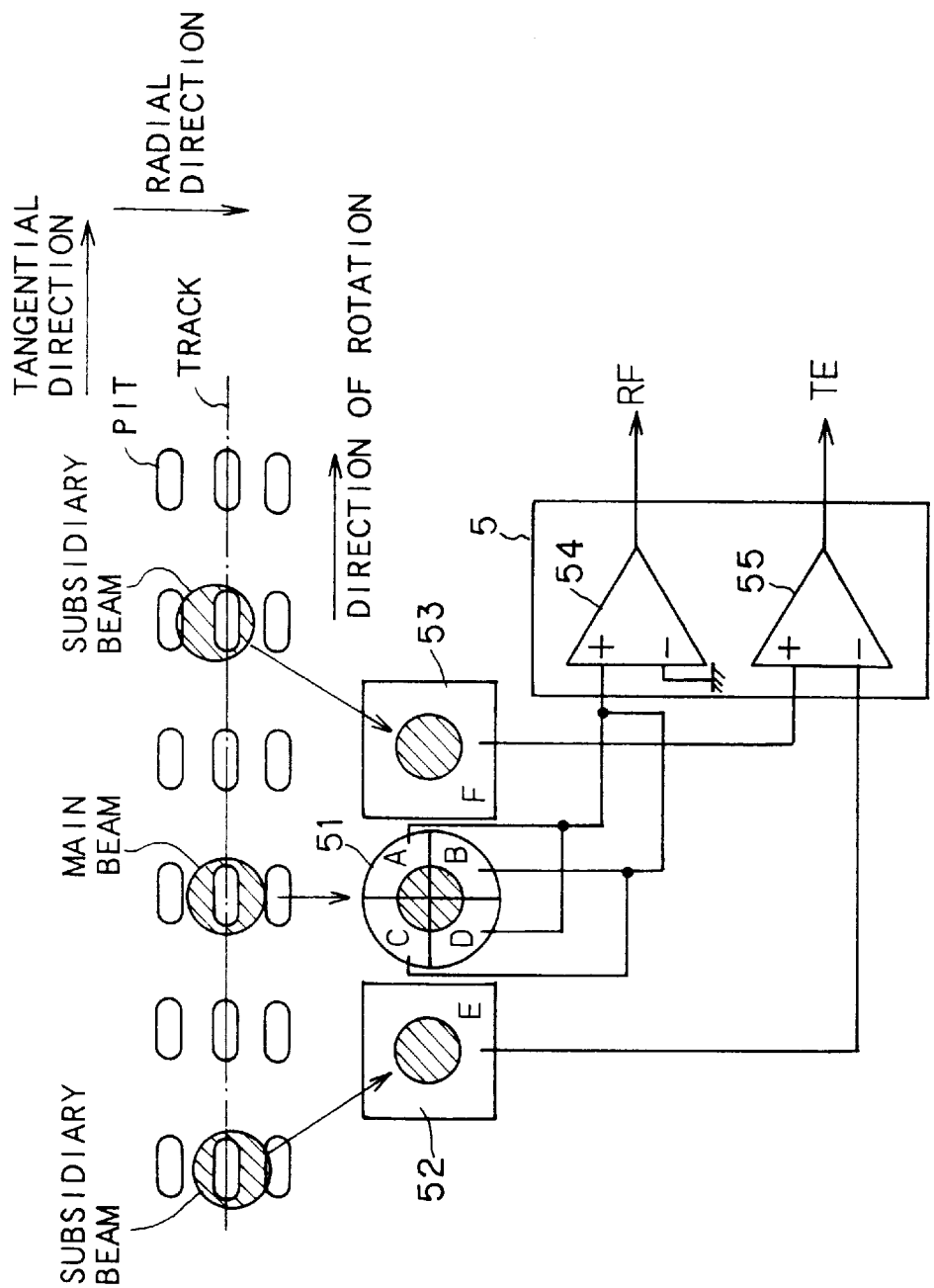
FIG. 2 is a diagram showing a structure of a pick-up and a pre-amplifier for obtaining an RF signal and a tracking error signal in the CD drive apparatus shown in FIG. 1.

As shown in FIG. 2, the pick-up 2 is a 3-beam type pick-up. The pick-up 2 divides a light beam emitted from a laser diode into three beams by means of grating. One of the three beams is a main beam for detecting a RF signal, and the two beams are subsidiary beams for detecting a tracking error signal. Positions of spots formed on the disk 1 by the subsidiary beams are slightly separated from the main beam in a CD rotational direction (tangential direction) and in a radial direction.

In addition, the pick-up 2 has a photo detector. As shown in FIG. 2, the photo detector has a 4-divided photo detector 51 for the main beam, and two photo detectors 52 and 53 for the subsidiary beams. Outputs of four channels A, B, C and D of the four-divided photo detector 51 are added to each other by an adder 54 of the pre-amplifier 5 so that a RF signal is obtained. Moreover, an output of an E channel of the photo detector 52 for the subsidiary beam on the leading side in the CD rotational direction (tangential direction) is subtracted from an output of an F channel of the photo detector 53 for the subsidiary beam on the trailing side in the CD rotational direction (tangential direction) by a subtracter 55 of the pre-amplifier 5 so that a tracking error signal is obtained. As shown in FIG. 2, when the main beam is on the track, a difference in the outputs between the E channel and the F channel based on reflected light beams (returned light beams) of the subsidiary beams on the leading and trailing sides is zero. When the main beam shifts one of the sides with respect to the radial direction of CD, the output of one channel becomes large, and it is detected as the tracking error signal.

Further, as shown in FIG. 1, the CD drive apparatus according to the present embodiment includes: an auto gain adjustment block 9 for adjusting gains of various error signals supplied from the pre-amplifier 5 so as to adjust the error signals to a predetermined signal level to a servo system; a servo equalizer 10 for adjusting a frequency for servo; a hold equalizer 11 for holding an output value of the servo equalizer 10 upon detection of a defect; a switch 12 for selecting one of the outputs of the servo equalizer 10 and the hold equalizer 11; a driver 13 for amplifying an electric current of a driving signal which was output and generated by the servo equalizer 10 or the hold equalizer 11 via the switch 12 so as to drive a focus/tracking coil (not shown), the carriage motor 3 and the spindle motor 4 of the pick-up 2; a micro computer 14 for controlling the whole system; and a memory 15 for storing an auto gain adjustment value thereinto.

The hold equalizer 11 has a low-pass filter or a digital filter. The hold equalizer 11 holds a tracking level of the tracking error signal which tracks an eccentric component from which a "horn-shaped component" was eliminated.

The CD drive apparatus according to the present embodiment further includes: a defect detector 16 for detecting a defect based on the RF signal generated and output from the pre-amplifier 5; a pulse generator 17 for when the defect detecting signal is output by the defect detector 16, outputting a predetermined pulse signal; and an adding portion 17 for adding the pulse signal output from the pulse generator 17 to the output of the hold equalizer 11.

The lens of the pick-up 2 is driven in the radial direction of the disk 1 by the tracking coil (not shown) and by a focus coil (not shown) for focus control. The lens is controlled by the servo system so that information from the track is received appropriately by a receiving portion.

Figure 3:
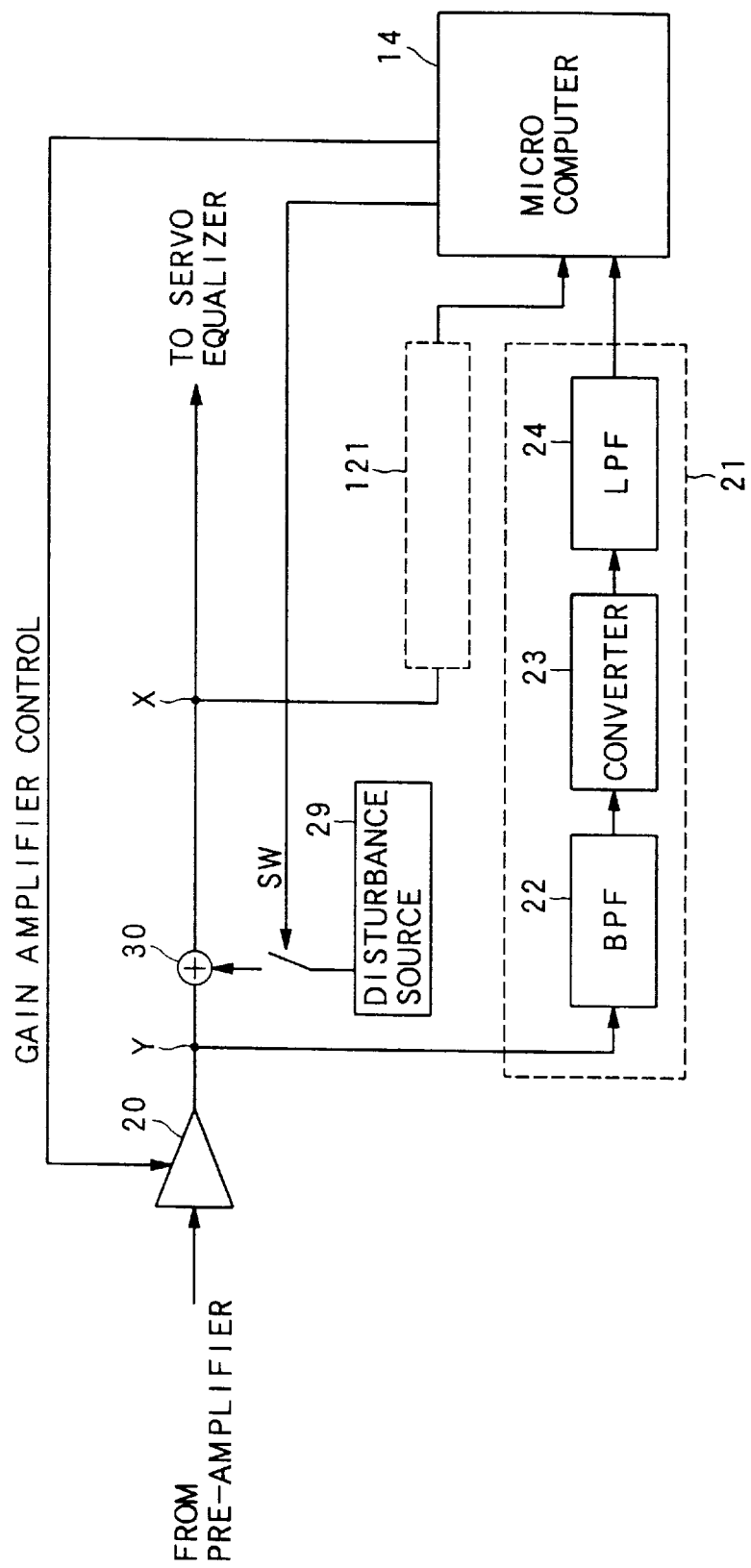
FIG. 3 is an explanatory diagram showing an auto gain adjustment block in the CD drive apparatus shown in FIG. 1.

FIG. 3 shows a detailed block of the auto gain adjustment block 9. The auto gain adjustment block 9 has a function for adjusting various error signals supplied from the pre-amplifier 5 so that their levels become suitable for inputting into the servo equalizer 10. In order to realize such a function, the auto gain adjustment block 9 has: a gain amplifier 20 for changing a gain of an error signal according to a gain amplifier control signal supplied from the micro computer 14; a first detecting block 21 for detecting a gain change amount of the error signal output from the gain amplifier 20; an adder 30 for adding disturbance to the error signal output from the gain amplifier 20; a disturbance source 29 for supplying disturbance to the adder 30; and a second detecting block 121 for detecting a gain change amount of a signal output from the adder 30.

The disturbance source 29 includes a generator and generates a fixed disturbance element whose amplitude and frequency are constant. This disturbance element is added to the error signal by the adder 30 in order to check the level of the error signal. A switch SW controls as to whether or not the disturbance element is added to the error signal. The switch SW is controlled by the micro computer 14.

The detecting block 21 has a band pass filter 22 for letting a signal pass a frequency band of the disturbance signal, a converter 23 for converting the signal into an absolute value signal, and a low-pass filter 24 for eliminating a frequency component of the disturbance signal so as to make the disturbance signal be direct current.

The first detecting block 21 is connected with an output side of the gain amplifier 20 via a branch point Y, and detects a gain change amount of the error signal including disturbance by circulating a servo loop. The first detecting block 21 has the band pass filter (BPF) 22 for letting a signal pass a frequency band of the disturbance component included in the error signal, the converter 23 for converting the signal output from the band pass filter 22 into an absolute value signal, and the low pass filter 24 for eliminating a frequency component of the disturbance signal so as to make the disturbance signal be direct current.

The second detecting block 121 is connected with an output side of the adder 30 via a branch point X. The second detecting block 121 has the structure same as that of the first detecting block 21.

Figure 4:
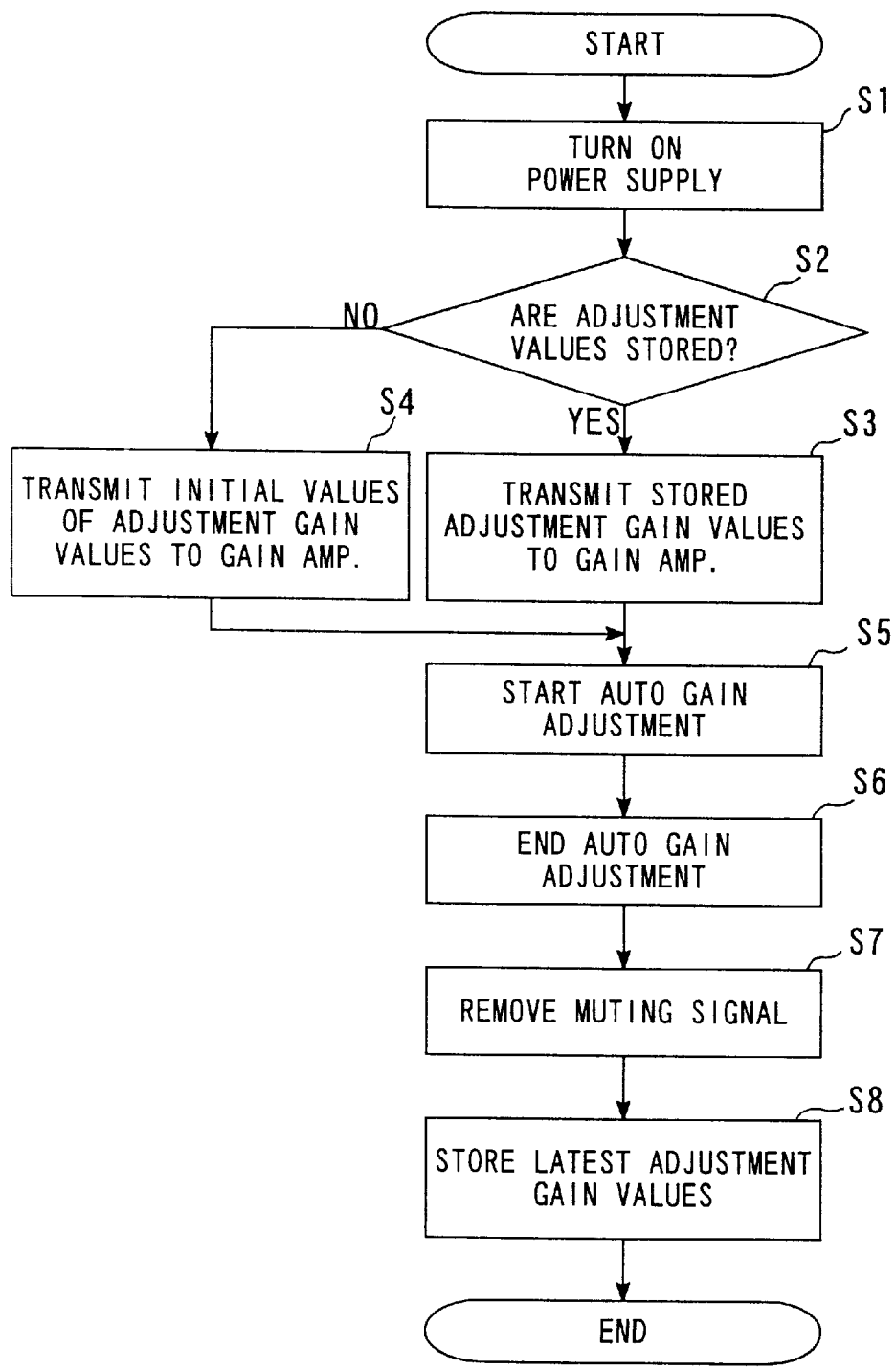
FIG. 4 is a diagram showing an operational sequence in the CD drive apparatus shown in FIG. 1.

There will be described below an operation of the apparatus according to the present embodiment based on the sequence of FIG. 4.

At first, when a power supply is turned on and CD is set (step S1), the micro computer 14 checks a predetermined address of the memory 15 and determines as to whether or not adjustment values up to the last time are stored (step S2). Since the memory 15 is composed of SRAM (static RAM) or the like which is backed up by a super capacitor or battery, when values are stored by reproducing operations up to the last time, the values in the memory 15 are held even if the main power supply is cut off.

When the determination is made the stored contents of the predetermined address have undefined values and they are not the values stored correctly (step S2: NO), namely, the determination is made that the memory 15 is newly used (first use after the memory is cleared) or contents of the memory 15 are destroyed due to a noise or another reasons, initial values of the adjustment gain values are transmitted to the gain amplifier 20 (step S4).

When the determination is made that correct values are stored (step S2: YES), the previous adjustment gain values stored in the predetermined address in the memory 15 are transmitted to the gain amplifier 20 (step S3). The adjustment gain values include a focus servo-use adjustment value (F) and a tracking servo-use adjustment value (T). These adjustment gain values are stored respectively in independent areas in the memory 15.

After the transmission of the adjustment gain values to the gain amplifier 20 is completed, the auto gain adjustment is started (step S5). In the auto gain adjustment, the gain adjustment values to be set in the gain amplifier 20 are finely adjusted by injecting disturbance (hereinafter, the finely-adjusted gain adjustment values are referred to as the "latest adjustment gain values").

After the auto gain adjustment is completed (step S6), a muting signal for stopping an output inversely quantized to an audio signal system is removed, and music is reproduced (step S7). Then, the latest adjustment gain values are stored onto the predetermined address in the memory 15 at appropriate timing (step S8). Here, the process shown in FIG. 4 is executed at timing that the set-up process of the CD drive apparatus is executed when the disk is inserted into the drive apparatus, or a key switch of a car is set to a Source-ON position or "Accessory (ACC-ON" position, or the power supply of the CD drive apparatus is turned on.

There will be described below a structure and operation of the defect detector.

Figure 5:
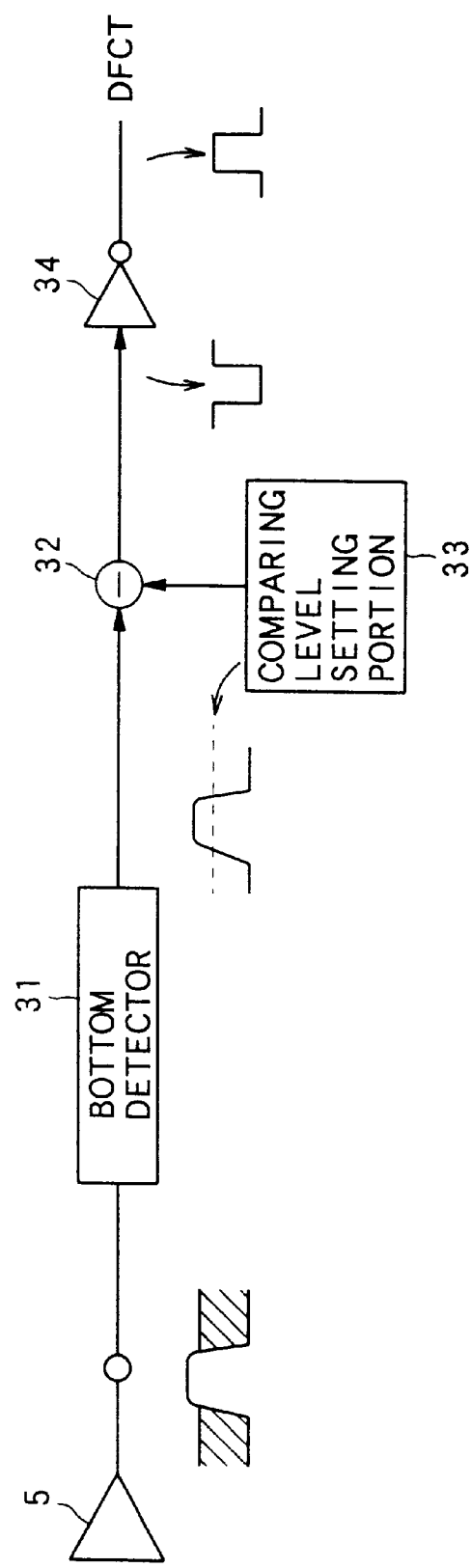
FIG. 5 is a block diagram showing a structure of the auto gain adjustment block in the CD drive apparatus shown in FIG. 1.

As shown in FIG. 5, the defect detector 16 of the present embodiment includes a bottom detector 31, a comparator 32, a comparing level setting portion 33 and an inverter 34. When the defect detector 16 detects a defect, it outputs a defect detected signal DFCT as a positive pulse signal.

Figure 6:
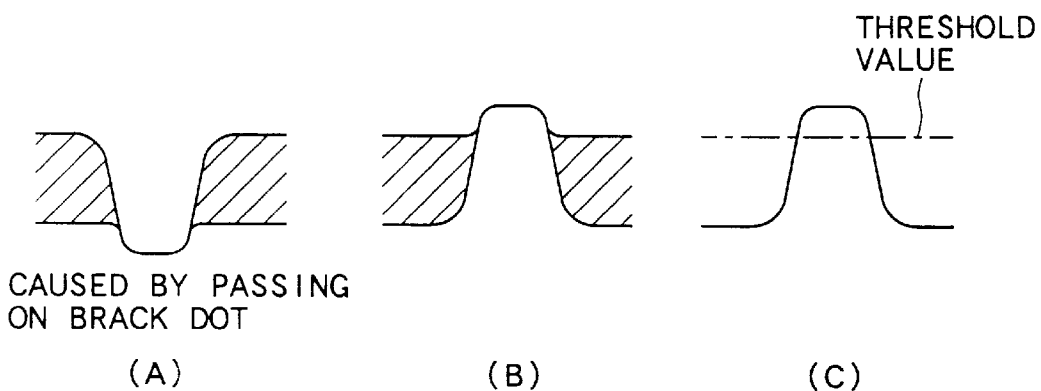
FIG. 6 is a diagram showing a defect which is generated in an RF signal when a main beam passes on a black dot, an RF signal shape corresponding to the defect input into a defect detector, and a waveform of the RF signal corresponding to the defect in the CD drive apparatus shown in FIG. 1.
Figure 7:
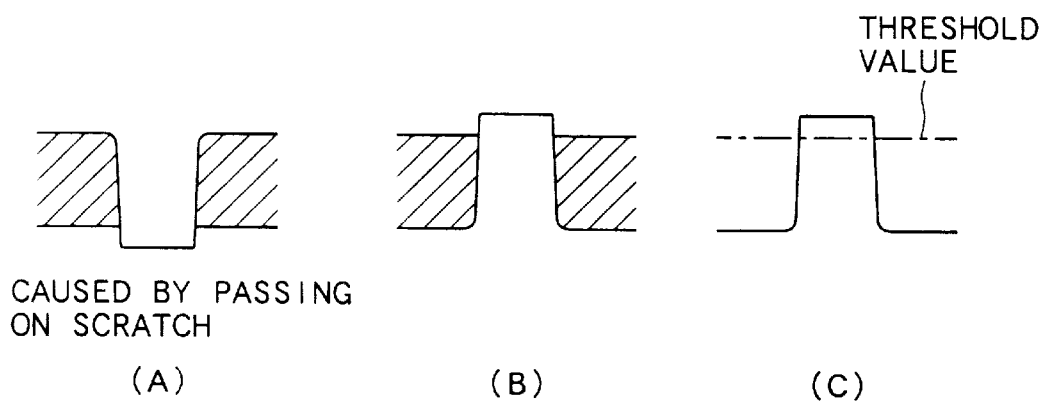
FIG. 7 is a diagram showing a defect which is generated in an RF signal when a main beam passes on a scratch, and a waveform of the RF signal corresponding to the defect in the CD drive apparatus shown in FIG. 1.

The description will given as to the operation of the defect detector 16. When a light beam passes on a black dot or scratch which exists on the surface of the disk, as shown in FIG. 6(A) or 7(A), the RF signal falls to a dark side and a defect occurs. The RF signal in which such a defect occurred is, as shown in FIG. 6(B) or 7(B), inverted to be read in the defect detector 16, and is supplied to a bottom detector 31 shown in FIG. 5. Next, the bottom detector 31 generates an envelope on the bottom side of the RF signal having such a shape so as to detect the signal as shown in FIG. 6(C) or 7(C), and outputs the detected signal to the comparator 32.

A predetermined threshold voltage is applied from the comparing level setting portion 33 to the comparator 32, and when the detected signal has a value lower than that of the threshold voltage, the comparator 32 outputs a high-level voltage, and when the detected signal has a value higher than that of the threshold voltage, the comparator 32 outputs a low-level voltage. As a result, in the case where a defect occurs in the RF signal, as shown in FIG. 5, a signal, which becomes low level only for a period that the detected signal has the threshold value or more, can be obtained. The polarity of this signal is inverted by the inverter 34 so as to be output as the defect detected signal DFCT. Therefore, in the case where a defect occurs in the RF signal, the defect detected signal DFCT becomes high level for a period that the detected signal has the threshold value or more, and in the case where a defect does not occur in the RF signal, the detected signal is always low level.

Here, in the defect detector 16, a detection time constant can be set arbitrarily, and the threshold value in the comparing level setting portion 33 can be set arbitrarily.

In addition, the defect detected signal DFCT output from the defect detector 16 is output to the hold equalizer 11 shown in FIG. 1 and is supplied to the switch 12. The hold equalizer 11 removes "a horn-shaped component" from a tracking error signal output from the servo equalizer 10 in a period that the defect detected signal DFCT becomes high level, and outputs a tracking level which tracks an eccentric component as a predetermined hold level voltage. When the hold level voltage is output, a contact of the switch 12 is switched to a side of SW2 shown in FIG. 1, and thus the hold level voltage is applied to the driver 13.

In the case where a black dot or scratch exists on the disk, not only the main beam but also subsidiary beams pass on the black dot or scratch. For this reason, in the case where a defect occurs in the RF signal, a defect occurs also in a reading signal based on the returned lights of the subsidiary beams. As a result, a normal tracking error signal cannot be obtained. Therefore, if the tracking error signal, which is obtained when a defect occurs in the RF signal is directly used, tracking servo is disturbed. However, in the present embodiment, when a defect occurs in the RF signal, the predetermined hold level driving voltage is applied to the driver 13 as mentioned above, and thus stable tracking servo is executed.

Figure 8:
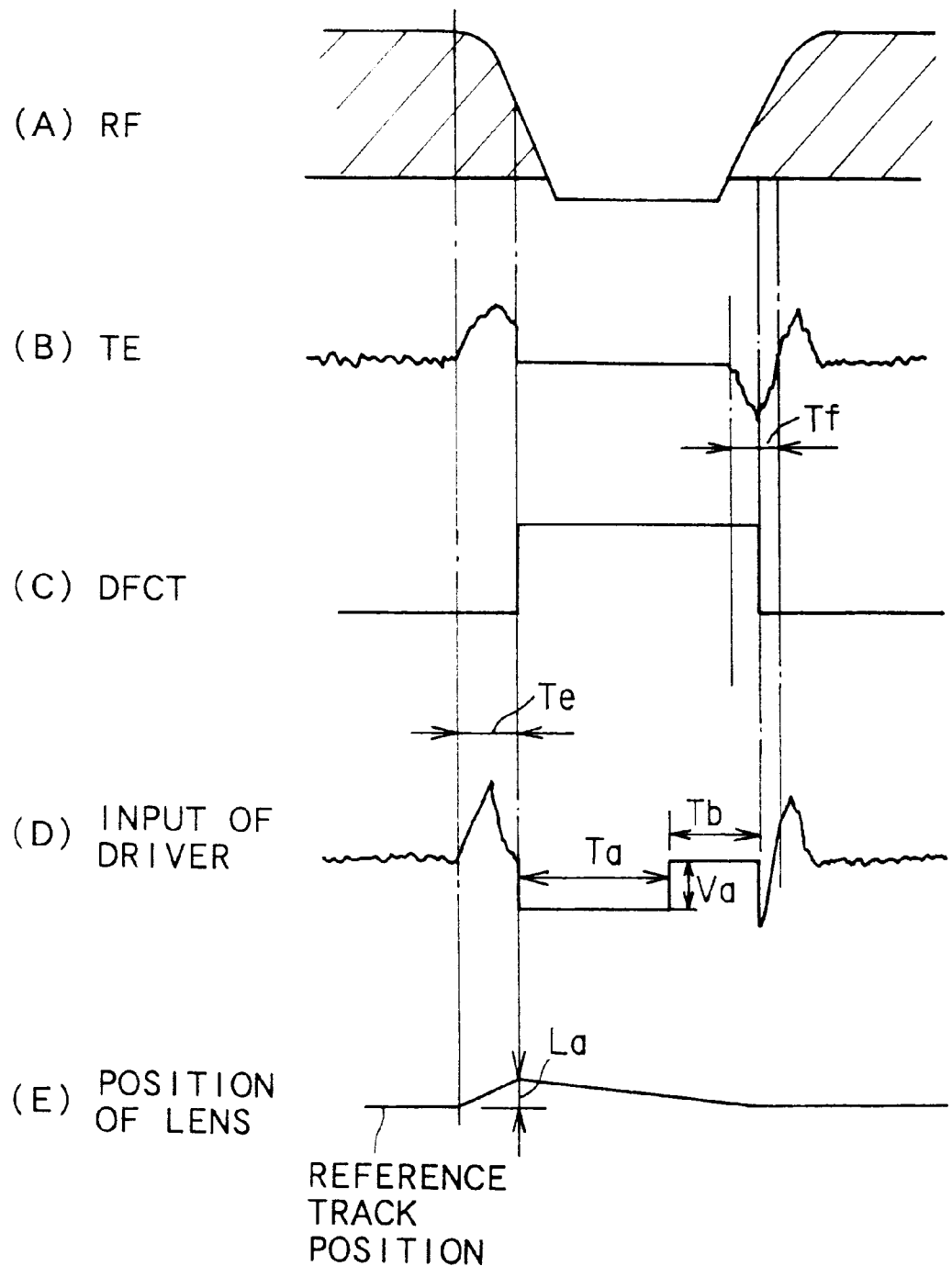
FIG. 8 is a diagram showing the RF signal when the main beam passes on a black dot or scratch, a tracking error signal and a defect detecting signal at that time, a driving signal to be output to the driver and a change in a lens position when the driving signal is output to the driver in the CD drive apparatus shown in FIG. 1.

Further, in the present embodiment, as shown in FIG. 8(C), a reset pulse shown in FIG. 8(D) is output from the pulse generator 17 in the period that the defect detected signal DFCT is high level. This reset pulse is a preset signal having a pulse width of Ta and a level value of Va. The reset pulse is supplied to the driver 13 via the adder 18 and the switch 12. After the output of the reset pulse is completed, the hold level signal is supplied to the driver 13 for period Tb.

As shown in FIG. 8(D), when the reset pulse and the hold level voltage are supplied to the driver 13, even if the subsidiary beams pass on the black dot or scratch, a shift of the lens in the pick-up 2 can be suppressed small. This effect will be described below.

When the main beam passes on a black dot or scratch, in the case where the defect shown in FIG. 8(A) occurs in the RF signal, the subsidiary beams also pass the black dot or scratch, and thus a change shown in FIG. 8(B) appears in the tracking error signal. As a result, "the horn-shaped component" is generated in the tracking error signal. A pulse-type signal shown in period Te in FIG. 8(D) is output from the servo equalizer 10 due to "the horn-shaped component" so as to be supplied to the driver 13. As a result, the lens moves, and thus the position of the lens is shifted from the position corresponding to the target track as shown in FIG. 8(E).

However, when the reset pulse is supplied from the pulse generator 17 to the driver 13, a force of a speed reducing direction opposed to the direction of an accelerating speed applied to the pick-up 2 in period Te is applied to the lens. As a result, the position of the lens starts to move towards the position corresponding to the target track. Then, since the hold level signal is supplied to the driver 13 in a period that it passes period Tb after the output of the reset pulse is completed, the stable tracking servo is executed, and thus the lens returns to the position corresponding to the target track.

In addition, as shown in FIG. 8(B), the tracking error signal changes for period Tf in a direction opposite to the case of period Te so that a signal of polarity opposite to the case of period Te is supplied to the driver 13. However, since period Tf that the tracking error signal changes and period Tb that the hold level signal is supplied to the driver 13 are overlapped with each other, the change in the output of the servo equalizer 10 with the change in the tracking error signal in period Tf is smaller than the case of period Te. As a result, the change in the tracking error signal in period Tf does not influence the movement of the lens.

According to the present embodiment, even in the case where the subsidiary beams pass on a black dot or scratch, the displacement of the lens can be suppressed to a slight distance La as shown in FIG. 8(E).

Figure 9:
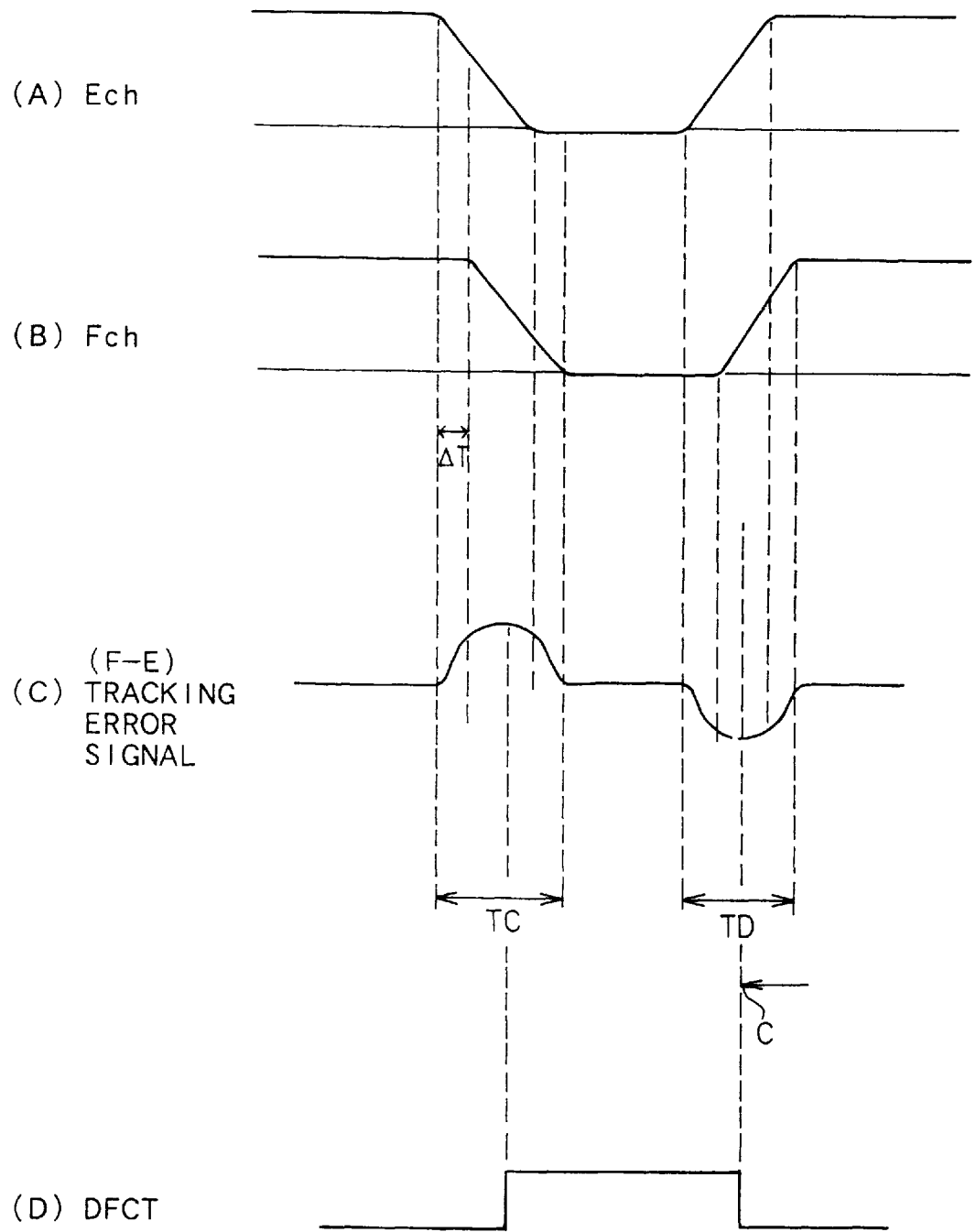
FIG. 9 is a diagram showing an output signal of a photo detector of an E channel when a leading subsidiary beam passes on a black dot or scratch, an output signal of the photo detector of an F channel when the trailing subsidiary beam passes on a black dot or scratch, a tracking error signal which is obtained from a difference between the output signals of the photo detector of the E channel and the photo detector of the F channel, and a defect detecting signal in the CD drive apparatus shown in FIG. 1.

Here, the reason that "the horn-shaped component" appears in the tracking error signal when the subsidiary beams pass on a black dot or scratch will be described below with reference to FIGS. 2 and 9.

As shown in FIG. 2, the two subsidiary beams are separated from each other in the tangential direction of the disk 1. For this reason, a time difference $\Delta T$ appears as shown in FIG. 9 for period from the time that the leading subsidiary beam enters a black dot or scratch to the time that the trailing subsidiary beam enters the black dot or scratch.

FIG. 9(A) shows output of the E channel of the photo detector obtained when the leading subsidiary beam passes on the black dot or scratch (see FIG. 2), and FIG. 9(B) shows output of the F channel of the photo detector obtained when the trailing subsidiary beam passes the black dot or scratch.

As mentioned above, the tracking error signal is generated by subtracting the output of the E channel from the output of the F channel (see FIG. 2). Therefore, when the time difference $\Delta T$ exists, a difference in the outputs between the F channel and E channel of the photo detector appears in period TC. As a result, as shown in FIG. 9(C), the tracking error signal changes so as to be projected to a positive side in very short period TC. Similarly, the tracking error signal changes so as to be projected to a negative side in very short period TD. These are "the horn-shaped components". Here, since the example shown in FIG. 9 shows the case that the hold level driving voltage is not applied to the driver 13 in order to ease the understanding, the waveform of the tracking error signal after the point C shown in FIG. 9(C) is different from that shown in FIG. 8(B).

Here, since "the horn-shaped component" of the tracking error signal is generated in very short period as mentioned above, it has a high frequency band which exceeds the range capable of responding by means of the servo equalizer 10. For this reason, the horn-shaped component passes through the servo equalizer 10 so as to be supplied to the driver 13 in the period Te as shown in FIG. 8(D). As a result, a driving force in a direction of accelerating the lens is applied to the pick-up 2, and a shown in FIG. 8(E), the position of the lens moves to a position shifted from the target track.

In present embodiment of the present invention, the displacement of the lens due to the generation of "the horn-shaped component" is corrected by applying the reset pulse having polarity opposite to that of "the horn-shaped component".

Figure 17:
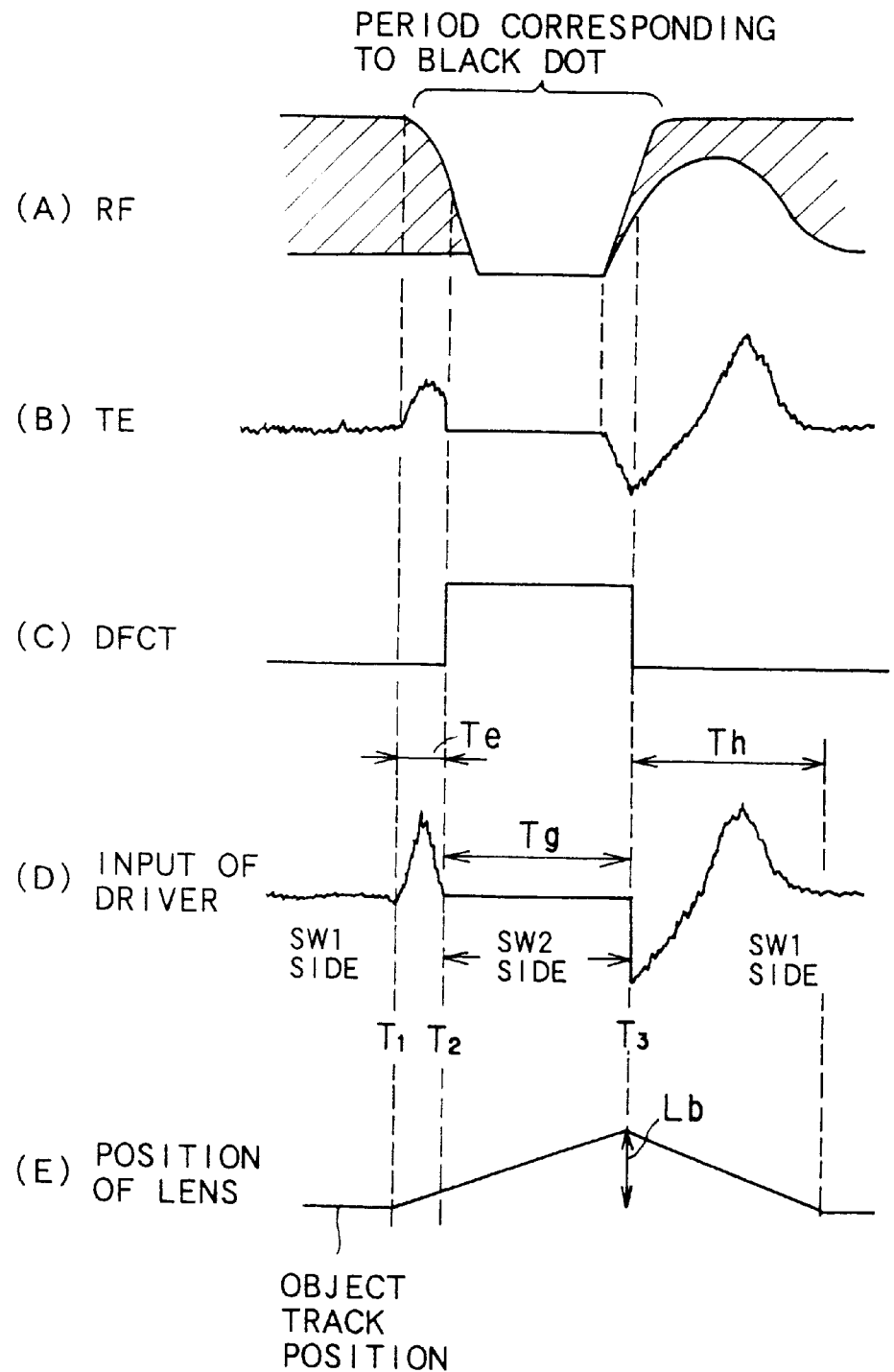
FIG. 17 is a diagram showing an RF signal when the main beam passes on a black dot or scratch, a tracking error signal and a defect detecting signal at that time, a driving signal output to the driver, and a change in the lens position when the driving signal is output to the driver in a CD drive apparatus of a comparative example.

The effect of the present invention is further clarified by comparison with the conventional example. FIG. 17 shows a timing chart of the tracking servo system upon the detection of a defect in the conventional CD drive apparatus. As shown in FIG. 17(D), since only the hold level driving signal is supplied to the driver 13 in period Tg in the conventional example, the influence of "the horn-shaped component" supplied to the drive 13 due to the change in the tracking error signal in period Te cannot be eliminated, and thus a moving distance of the lens from the target track becomes a distance Lb. The distance Lb is extremely longer than the distance La in the structure in the present embodiment, and due to this influence, it takes a long time by period Th compared with the present embodiment that the lens returns to the original position corresponding to the target track. In the conventional example, in the case where a defect occurs in the RF signal and the reading signal of the subsidiary beam, the lens moves even while the servo is held, and thus the performance is deteriorated.

Figure 10:
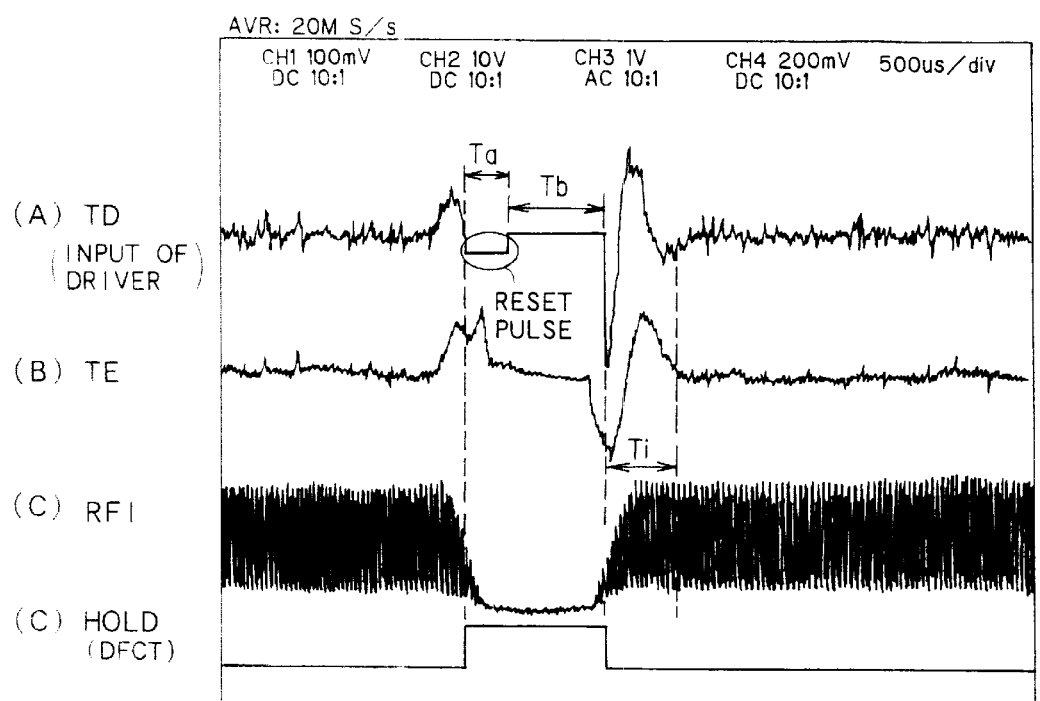
FIG. 10 is a diagram showing a measured waveform of the driving signal to the driver when the light beam passes on a black dot or scratch, a measured waveform of the tracking error signal, a measured waveform of the RF signal and a measured waveform of the defect detecting signal in the CD drive apparatus shown in FIG. 1.

On the contrary, according to the present embodiment, since the influence of "the horn-shaped component" supplied to the drive 13 due to abrupt change in the tracking error signal can be eliminated by the reset pulse having polarity opposite to that of "the horn-shaped component", even in the case where a defect occurs in the RF signal and the reading signal of the subsidiary beam, the effect of the servo hold can be maintained satisfactorily. FIG. 10 shows data measured in the apparatus of the present embodiment. As shown in FIGS. 10(A) and 10(D), it is found that the reset pulse, which has polarity opposite to that of the pulse signal supplied to the driver 13 just before the defect detected signal DFCT becomes high level, is supplied to the driver 13 for period Ta, and then the hold level signal is supplied to the driver 13 for period Tb. As a result, as shown in FIG. 10(B), after the defect detected signal DFCT becomes low level, the value of the tracking error signal converges to 0 as the target value in short period Ti.

Here, in the above description, since the polarity of "the horn-shaped component" supplied to the driver 13 just before the defect detected signal DFCT becomes high level is positive, the polarity of the rest pulse is set to negative, but since the polarity of "the horn-shaped component" is different according to the structure of the pre-amplifier 5, if the polarity of "the horn-shaped component" is negative, the polarity of the reset pulse may be set to positive.

(ii) Second Embodiment

There will be described below the second embodiment of the present invention with reference to FIGS. 11 through 13. Here, the same reference numerals are given to the parts identical to those in the first embodiment, and the description thereof is omitted.

In the present embodiment, an amplitude of the reset pulse is changed appropriately with the fluctuation of the auto gain adjustment value.

Figure 11:
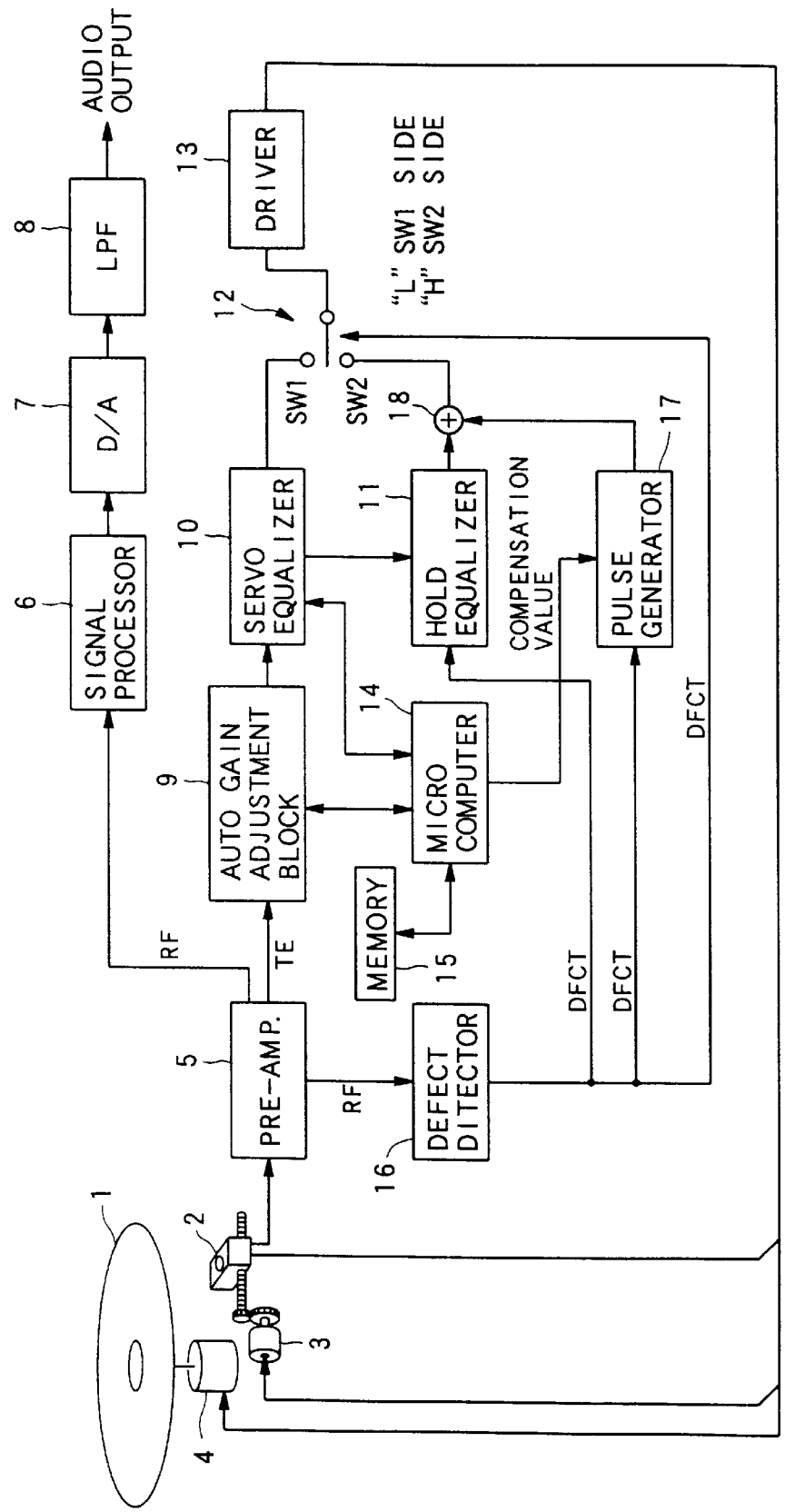
FIG. 11 is a block diagram showing a structure of a CD drive apparatus according to a second embodiment of the present invention.

As shown in FIG. 11, the CD drive apparatus of the present embodiment is different from the CD drive apparatus of the first embodiment shown in FIG. 1 in that the micro computer 14 is connected with the pulse generator 17. The CD drive apparatus of the present embodiment is constituted so that a corrected value of the amplitude of the reset pulse can be output from the micro computer 14 to the pulse generator 17.

There will be described below the reset pulse correcting process of the present embodiment with reference to the flow chart of FIG. 12.

At first, after the power supply is turned on and the CD is set (step S10), a check is made by the micro computer 14 as to whether or not adjusted values up to the last time are stored in the memory 15 (step S11). When the stored contents are indefinite values and the values were not stored appropriately last time (step S11: NO), the determination is made that the memory is newly used or the memory contents are broken due to a noise or the like, and a constant gain adjustment value X (conventional initial value) is transmitted to the gain amplifier 20 (step S13).

Meanwhile, when it is recognized that the appropriate values are stored (step S11: YES), a last adjustment value Y stored in the memory 15 is transmitted to the gain amplifier 20 (step S12). Since the gain amplifier 20 has memories for a focus servo-use adjustment value (F) and a tracking servo-use adjustment value (T), the values are transmitted individually to these memories. The process up to here is the same as the process at steps S1 through S4 in the first embodiment shown in FIG. 4.

Next, an initial value A of the reset pulse is output to the pulse generator 17 (step S14). More concretely, similarly to the first embodiment, values of the pulse width Ta and pulse voltage Va are output to the pulse generator 17. As a result, in the pulse generator 17, the pulse width and pulse voltage of the reset pulse to be output are set.

Next, the auto gain adjustment described in the first embodiment is started (step S15). In the auto gain adjustment, similarly to the first embodiment, the gain adjustment value to be set in the gain amplifier 20 by disturbance injection is finely adjusted so that the latest gain adjustment value is set in the gain amplifier 20. When the auto gain adjustment is completed (step S16), the latest gain adjustment value is determined as a gain adjustment value Z to be used for a correcting process this time (step S17).

Then, the ratio of the gain adjustment value Z to the constant gain adjustment value X as the initial value is obtained, and this ratio is determined as a correcting coefficient B (step S18). Next, the initial value A of the reset pulse is multiplied by the correcting coefficient B so that a new set value A is calculated and the new set value A is output to the pulse generator 17 (step S19). Here, in the present embodiment, since only the pulse voltage of the reset pulse is corrected, the contents of the new initial value A is a pulse width Ta and a pulse voltage Va' (=Va×B).

After the correcting process as below, the muting signal for stopping the output inversely quantized to the audio signal system is removed so that music is reproduced (step S20). The latest adjustment value Z determined at step S17 is again stored as the storage value Y in a predetermined address at appropriate timing, and the focus servo and tracking servo are ended (step S21).

Figure 12:
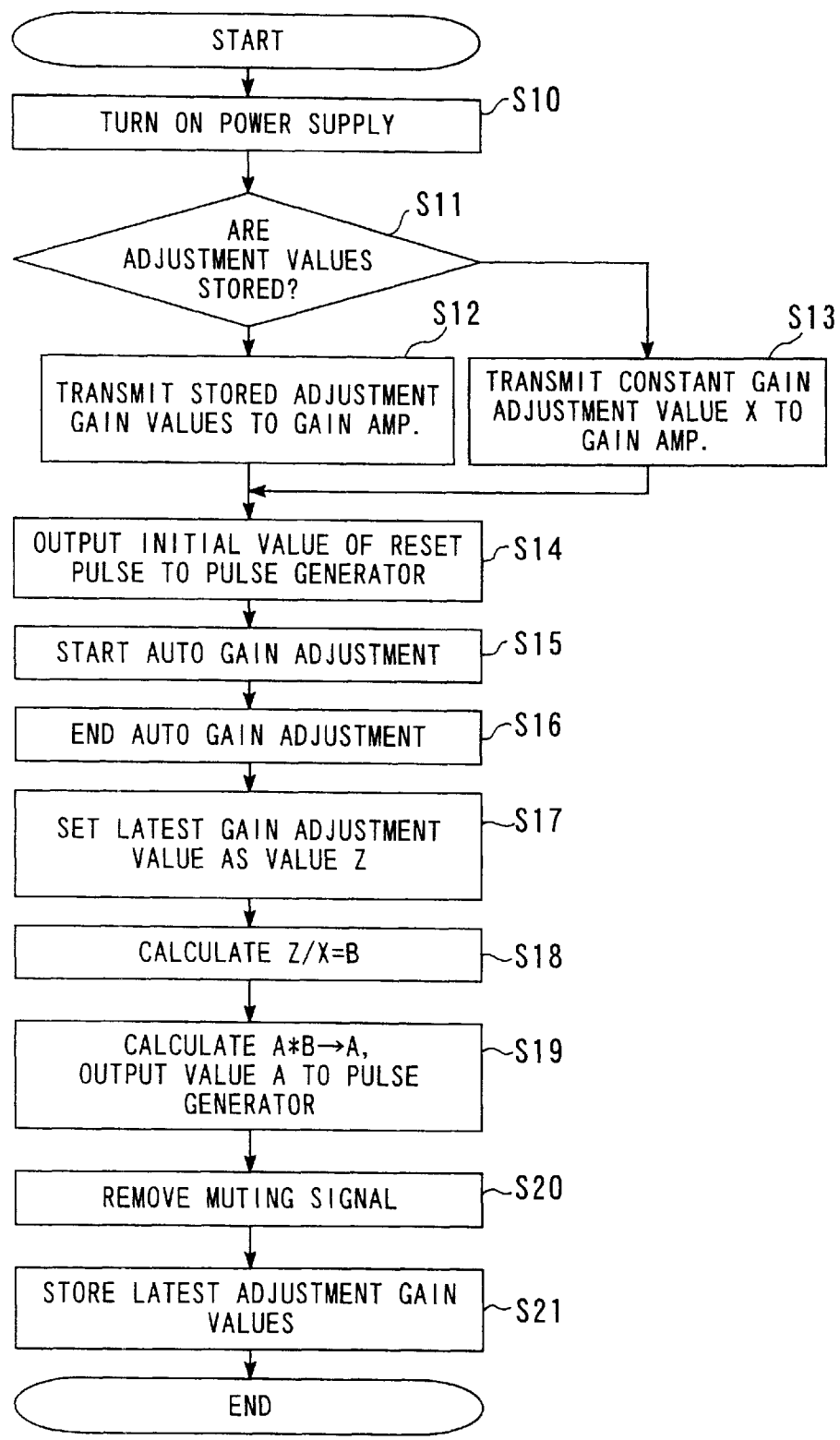
FIG. 12 is an operational sequence showing an auto gain adjustment process and a reset pulse correcting process in the CD drive apparatus shown in FIG. 11.

The process shown in FIG. 12 is executed at timing that the set-up process of the CD drive apparatus is executed when the disk is inserted into the drive apparatus, or the key switch of the car is set in the source ON position or accessory (ACC) ON position, or the power supply of the CD drive apparatus is turned on.

Since the present embodiment has the above structure, even in the case where the gain of the servo equalizer 10 changes greatly, an appropriate reset pulse can be output to the driver 13.

Figure 13A:
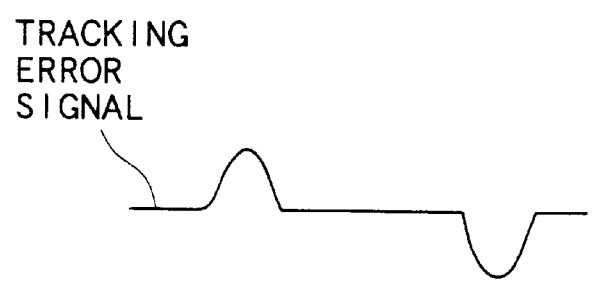
FIG. 13A is a diagram showing a tracking error signal when the light beam passes on a black dot or scratch in the CD drive apparatus shown in FIG. 11.
Figure 13B:
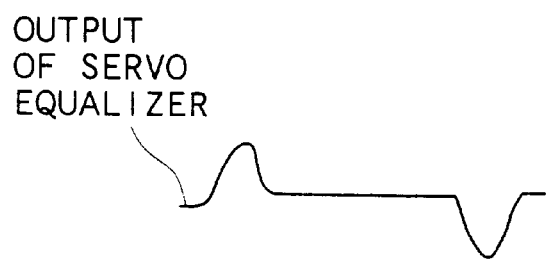
FIG. 13B is a diagram showing an output signal of a servo equalizer at the time of gain a of the servo equalizer.
Figure 13C:
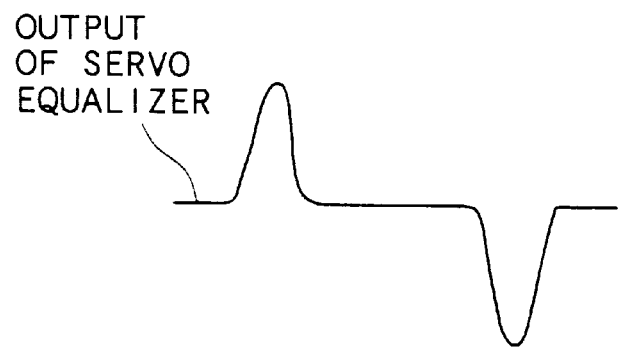
FIG. 13C is a diagram showing an output signal of the servo equalizer at the time of gain b of the servo equalizer.

As described in the first embodiment, when the subsidiary beams pass on a black dot or scratch, as shown in FIG. 13A, "the horn-shaped component" is generated in the tracking error signal output from the pre-amplifier 5, and "the horn-shaped component" is generated also in the output signal from the servo equalizer 10 as shown in FIG. 13B. Since the amplitude of the horn-shaped component is in proportion to the gain of the servo equalizer 10, if the state shown in FIG. 13B is such that the gain of the servo equalizer 10 is gain a, for example, when the gain of the servo equalizer 10 changes into a gain b which is twice as large as the gain a as the result of the auto gain adjustment, "the horn-shaped component" which is generated in the output signal from the servo equalizer 10 becomes larger in proportion to the change in the gain as shown in FIG. 13C. Therefore, a distance that the lens moves due to the signal shown in FIG. 13C becomes longer by the signal shown in FIG. 13B.

Figure 14:
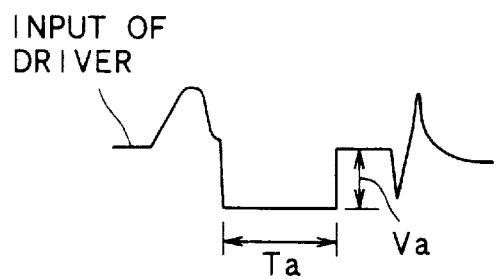
FIG. 14A is a diagram showing a driver driving signal at the time of gain a of the servo equalizer in the CD drive apparatus shown in FIG. 11.
FIG. 14B is a diagram showing a driver driving signal at the time of gain b of the servo equalizer in a comparative example where a correcting process is not executed for the reset pulse.
FIG. 14C is a diagram showing a driver driving signal at the time of gain b of the servo equalizer in the present embodiment where the correcting process is executed for the reset pulse.
Figure 14:
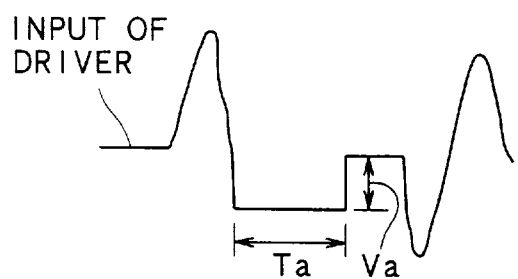
Figure 14:
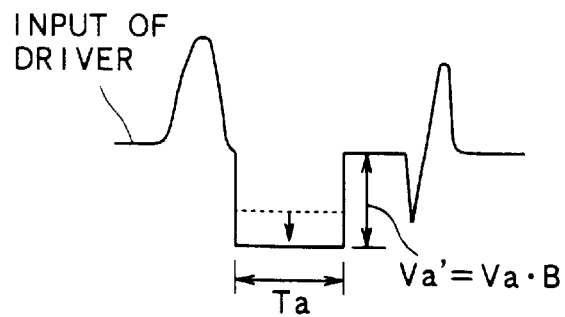

In this case, in the present embodiment, since the pulse voltage of the reset pulse is corrected in proportion to the gain of the servo equalizer 10, as shown in FIG. 14C, the reset pulse having the pulse voltage (Va'=Va×B) corresponding to the amplitude of "the horn-shaped component" is output. As a result, the amount of the lens movement due to "the horn-shaped component" can be eliminated by the reset pulse securely. Therefore, even in the case where the gain is adjusted according to the change in temperature or humidity, the stable tracking servo is executed, and thus deterioration in the performance in the CD drive apparatus can be prevented securely.

Here, the correcting process is not executed by directly using the correcting coefficient B but may be executed by multiplying the correcting coefficient B on which a certain weight is placed by the initial value A of the reset pulse. For example, the correcting coefficient B is multiplied by a coefficient k and the set value A of the reset pulse is obtained according to A×Bk, and the value of the coefficient k is changed experimentally so that the coefficient k, which is obtained when the displacement of the lens becomes the smallest, may be adopted.

In addition, in the present embodiment, the pulse voltage of the reset pulse is corrected, but the present invention is not limited to this, and thus the pulse width of the reset pulse may be corrected.

In addition, the present embodiment described the example that the initial value A of the reset pulse is corrected, but the present invention is not limited to this, and thus similarly to the auto gain adjustment, a last gain adjustment coefficient C is stored, and in the auto gain adjusting process the ratio D of the latest adjustment value Z to the last storage value Y is obtained from Z/Y=D, and the ratio D is multiplied by the last gain adjustment coefficient C so that a final gain adjustment coefficient C may be obtained as C←C×D.

(iii) Third Embodiment

There will be described below the third embodiment of the present invention with reference to FIGS. 15 and 16. Here, the same reference numerals are given to the parts identical to those in the first and second embodiments, and the description thereof is omitted.

In the present embodiment, an RF signal or a tracking error signal output from the pre-amplifier 5 is read by the micro computer 14, and the reset pulse correcting process is executed according to a change in the levels of these signals.

Figure 15:
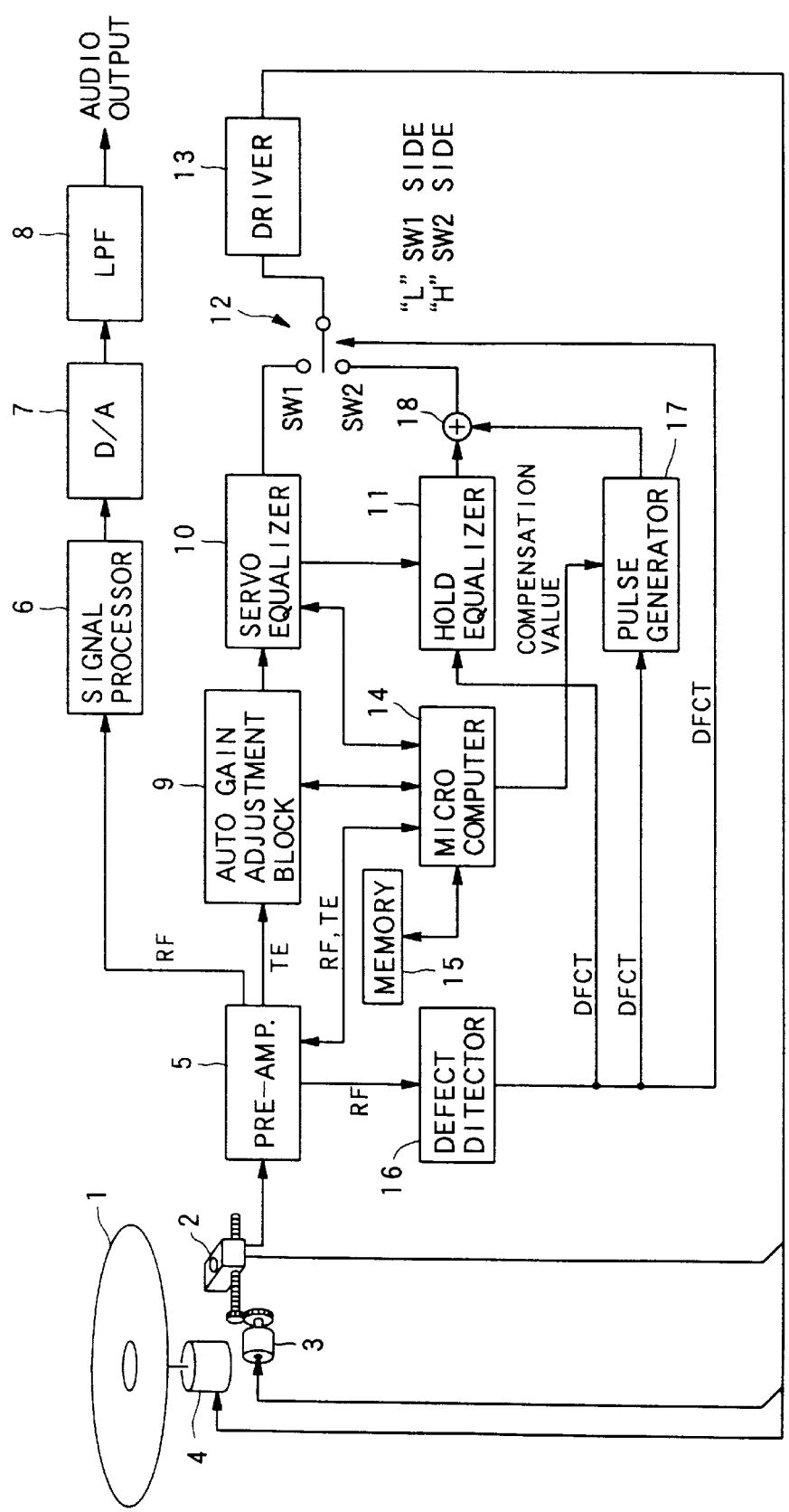
FIG. 15 is a block diagram showing a structure of a CD drive apparatus according to a third embodiment of the present invention.

As shown in FIG. 15, the CD drive apparatus of the present embodiment is different from the CD drive apparatus of the second embodiment shown in FIG. 11 in that the micro computer 14 is connected with the pre-amplifier 5. The CD drive apparatus of the present embodiment is constituted so that an RF signal or a tracking error signal can be read from the pre-amplifier 5 by the micro computer 14.

There will be described below the reset pulse correcting process in the present embodiment with reference to the flow chart of FIG. 16.

At first, after the power supply is turned on and the CD is set (step S30), an initial value A of the reset pulse is output to the pulse generator 17 (step S31). More concretely, values of the pulse width Ta and the pulse voltage Va are output to the pulse generator 17. As a result, in the pulse generator 17, the pulse width and pulse voltage of the reset pulse to be output are set.

Next, the focus servo is closed (step S32), and a level Y of the tracking error signal is read from the pre-amplifier 5 by the micro computer 14 in the state that the lead-in of the focus servo is completed (step S33).

Next, the tracking servo is closed (step S34), and the auto gain adjustment is started in the state that the lead-in of the tracking servo is completed (step S35). After the auto gain adjustment is completed, a reference value X of the tracking error signal stored in the memory 15 is read by the micro computer 14, and the ratio of the level Y of the tracking error signal read at step S33 to the reference value X is obtained so that the correcting coefficient B is calculated according to Y/X=B (step S36).

Next, the initial value A of the reset pulse is multiplied by the correcting coefficient B so that a new set value A is calculated, and the new set value A is output to the pulse generator 17 (step S37). Also in the present embodiment, since the pulse voltage of the reset pulse is corrected, the contents of the new set value A are the pulse width Ta and pulse voltage Va' (=Va×B).

Figure 16:
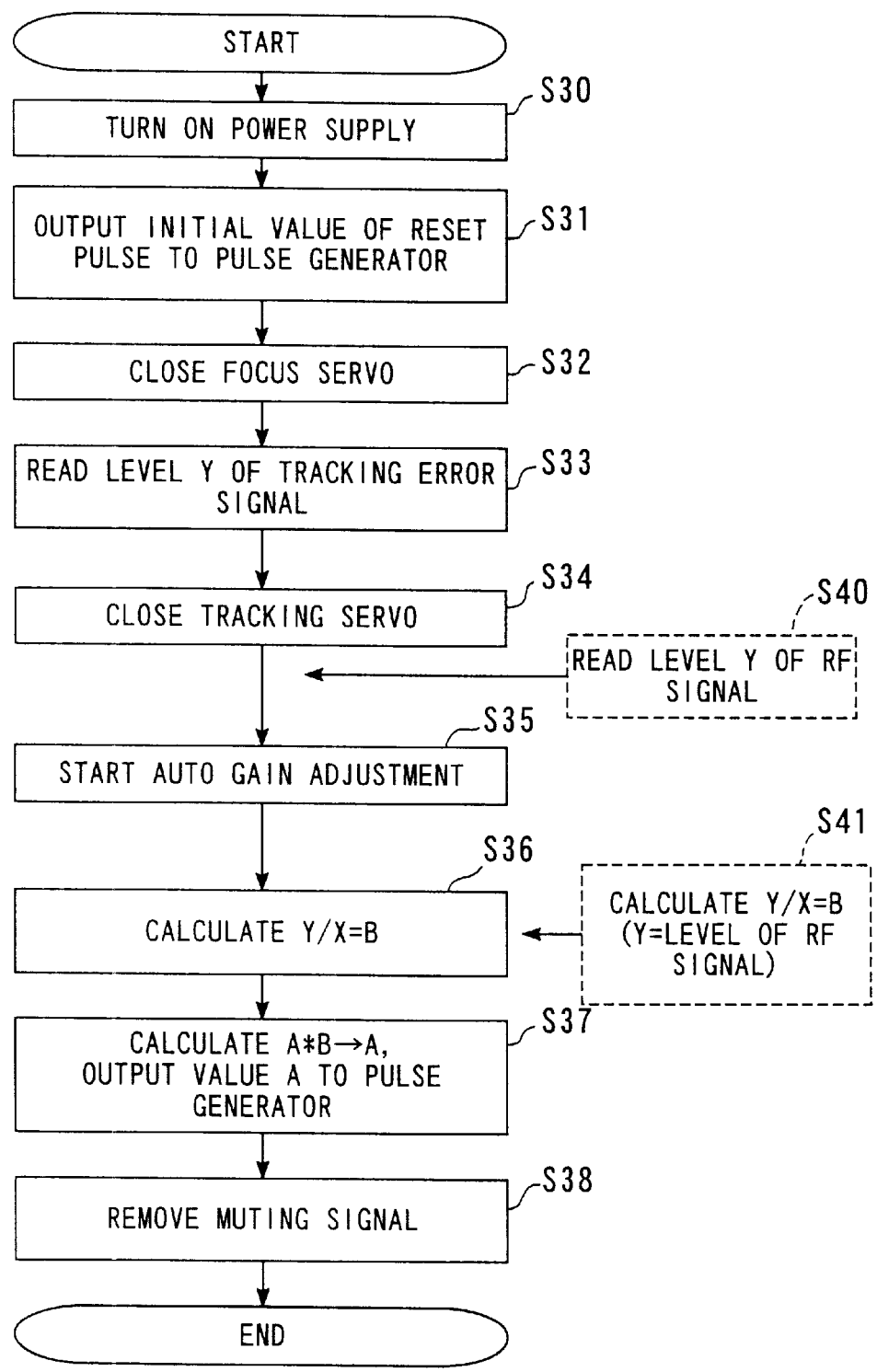
FIG. 16 is an operational sequence showing the auto gain adjustment process and the reset pulse correcting process in the CD drive apparatus shown in FIG. 15.

Here, the process shown in FIG. 16 is executed at timing that the CD drive apparatus set-up process is executed when the disk is inserted into the drive apparatus, or the key switch of a car is set in the source ON position or in the accessory (ACC) ON position, or the power supply of the CD drive is turned on.

After the correcting process is completed, the muting signal for stopping the output inversely quantized to the audio signal system is removed and music is reproduced (step S38).

Here, the flow chart shown in FIG. 16 does not show an updating process of the auto gain adjustment value of the first and the second embodiments, but also in the present embodiment, the auto gain adjustment value updating process similar to that of the first and second embodiments may be executed.

In addition, in the case where the reset pulse correcting process is executed by using the RF signal level is used as reference level, as shown in a frame surrounded by a dotted line in FIG. 16, after the tracking servo is closed (step S34), the RF signal level is read from the pre-amplifier 5 by the micro computer 14 (step S40), and after the auto gain adjustment (step S35), the reference value X of the RF signal stored in the memory 15 is read by the micro computer 14. Then, the ratio of the level Y of the RF signal read at step S40 to the reference value X is obtained so that the correcting coefficient B is calculated according to Y/X=B (step S41).

Since the present embodiment has the above structure, even when the level of the tracking error signal or the RF signal is changed by influences of aging of the components in the CD drive apparatus, temperature and humidity, a stain on the information recording surface of CD, a stain on the objective lens in the pick-up 2 and the like, and when the loop gain of the closed circuit loop composed of the disk 1, the pick-up 2, pre-amplifier 5, the auto gain adjustment block 8, the servo equalizer 10 and the driver 13 shown in FIG. 15 is changed, an appropriate reset pulse can be output to the driver 13.

When the loop gain is changed, accordingly the gain of the servo equalizer 10 is changed by the auto gain adjustment, and as described in the second embodiment, the amplitude of "the horn-shaped component" of the output signal from the servo equalizer 10, which is generated when the subsidiary beams pass on a black dot or scratch, is changed. However, according to the above structure, an amount of the lens movement due to "the horn-shaped component" can be eliminated securely by the appropriate reset pulse, and the stable tracking servo is executed so that deterioration of the performance in the CD drive apparatus can be prevented securely.

Here, also in the present embodiment, the correcting process is not executed by directly using the correcting coefficient B but may be executed by multiplying the correcting coefficient B, on which a certain weight was placed, by the initial value A of the reset pulse.

In addition, in the present embodiment, the pulse voltage of the reset pulse is corrected, but the present invention is not limited to such a structure, and thus the pulse width of the reset pulse may be corrected.

(iv) Fourth Embodiment

There will be described below the fourth embodiment of the present invention.

In the present embodiment, similarly to the second embodiment, the correcting coefficient B is calculated based on the auto gain adjustment value, and similarly to the third embodiment, the correcting coefficient B is calculated based on the tracking error signal, and similarly to the third embodiment the correcting coefficient B is calculated based on the RF signal, and the correcting process is executed by combining these correcting coefficients with each other.

When the correcting coefficient B based on the auto gain adjustment value is $\alpha$, the correcting coefficient B based on the tracking error signal is $\beta$, and the correcting coefficient B based on the RF signal is $\gamma$, the initial value A of the reset pulse is:

$$A \leftarrow A*(m \cdot \alpha)*(n \cdot \beta)*(l \cdot \gamma)$$

and a new set value A of the reset pulse is obtained so as to be output to the pulse generator 17. Here, m, n and l are coefficients for placing weights experimentally obtained in order to return a position of a beam earlier to its original position.

Since a projected change in the tracking error signal generated upon the detection of a defect depends on the auto gain adjustment, the level of the tracking error signal and the level of the RF signal, a moving amount of the lens position upon the detection of a defect can be further smaller by using these three parameters.

In addition, also the process for correcting the set value of the reset pulse in the present embodiment is executed at timing that the set-up process for the CD drive apparatus is executed when the disk is inserted into the drive apparatus, or the key switch of a car is set in the source ON position or accessory (ACC) ON position or the power supply of the CD drive apparatus is turned on. However, this process can be executed at another timing.

In addition, the CD drive apparatus of the respective embodiments is provided with temperature detecting means for detecting a temperature in the apparatus. An output of the temperature detecting means is monitored, and when the output becomes not less than (or not more than) a certain level, the auto gain adjustment value, the level of the tracking error signal and the level of the RF signal are read at the first interval of the music so that the correcting process may be executed. In such a structure, while the disk is inserted and the reproducing operation is performed, even if the temperature in the apparatus rises and the loop gain is changed, the appropriate correcting process can be executed for the reset pulse, and thus the lens moving amount upon the detection of a defect can be small.

Here, the above embodiments described the example that the present invention is applied to the CD drive apparatus, but the present invention is not limited to this, and thus the present invention can be applied to drive apparatuses for optical recording media such as MD (Mini Disc) and DVD other than CD.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. Hei 10-331444 filed on Nov. 20, 1998 including the specification, claims, drawings and summary is incorporated herein by reference in its entirety.

What is claimed is:

1. An apparatus for driving an optical pickup for a tracking servo control, the apparatus comprising:

an emitting device disposed in the optical pickup for emitting a main beam to a first position on an information track of a recording medium and emitting at least two subsidiary beams to a second position and a third position on the information track of the recording medium, respectively, the second position being different from the first position at least in a tangential direction of the recording medium, the third position being different from the first position at least in a tangential direction of the recording medium, the second position being different from the third position at least in a tangential direction of the recording medium;

a tracking error signal generating device for generating a tracking error signal using returned light beams of the subsidiary beams from the recording medium;

a driving device for moving the first position of the main beam and the second position and the third position of the subsidiary beams with respect to the recording medium;

a tracking control device for outputting a driving signal based on the tracking error signal to the driving device; and a detecting device for detecting a damaged part on the recording medium, wherein the tracking control device comprises a pulse signal generating device for generating a pulse signal having a polarity opposite to a disturbance part of the driving signal generated due to at least one of the subsidiary beams passing on the damaged part, and the tracking control device uses the pulse signal as a part of the driving signal, wherein the tracking control device further comprises a signal maintaining device for setting a level of the driving signal at a hold level after the tracking control device uses the pulses signal as the part of the driving signal, and maintaining the hold level for a predetermined period of time, and the hold level is equal to a level of the driving signal in a state before the detecting device detects the damaged part.

2. The apparatus according to claim 1, wherein the signal maintaining device maintains the hold level until a detection of the damaged part with the detecting device ends.

3. The apparatus according to claim 1, wherein the tracking control device further comprises a pulse setting device for setting a level or a pulse width of the pulse signal on the basis of an amount of a movement of the main beam due to the disturbance part of the driving signal.

4. The apparatus according to claim 1, wherein the tracking control device further comprises:

a gain detecting device for detecting a gain of the tracking control device; and a pulse setting device for setting a level or a pulse width of the pulse signal on the basis of the gain of the tracking control device.

5. The apparatus according to claim 1, wherein the tracking control device further comprises:

a level detecting device for detecting a level of the tracking error signal; and a pulse setting device for setting a level or a pulse width of the pulse signal on the basis of the level of the tracking error signal.

6. The apparatus according to claim 1 further comprising an RF signal generating device for generating an RF signal on the basis of a returned light beam of the main beam from the recording medium, and wherein the tracking control device further comprises:

an RF signal level detecting device for detecting a level of the RF signal; and a pulse setting device for setting a level or a pulse width of the pulse signal on the basis of the level of the RF signal.

7. The apparatus according to claim 1 further comprising an RF signal generating device for generating an RF signal on the basis of a returned light beam of the main beam from the recording medium, and wherein the tracking control device further comprises:

a gain detecting device for detecting a gain of the tracking control device;

a level detecting device for detecting a level of the tracking error signal;

an RF signal level detecting device for detecting a level of the RF signal; and a pulse setting device for setting a level or a pulse width of the pulse signal on the basis of the gain of the tracking control device, the level of the tracking error signal and the level of the RF signal.

8. The apparatus according to claim 7, wherein the pulse setting device comprises calculation device for generating a calculation value using a first value representing the gain of the tracking control device, a second value representing the level of the tracking error signal, a third value representing the level of the RF signal, a first coefficient for weighting the gain of the tracking control device, a second coefficient for weighting the level of the tracking error signal, and a third coefficient for weighting the level of the RF signal, and the pulse setting device sets the level or pulse width of the pulse signal on the basis of the calculation value.

* * * * *